(12) United States Patent
Beck et al.

(10) Patent No.: US 8,663,053 B2
(45) Date of Patent: Mar. 4, 2014

(54) MULTISTEP GEAR MECHANISM OF PLANETARY DESIGN

(75) Inventors: Stefan Beck, Eriskirch (DE); Gerhard Gumpoltsberger, Friedrichshafen (DE); Christian Sibla, Friedrichshafen (DE); Michael Wechs, Lindau (DE); Juergen Wafzig, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/995,790

(22) PCT Filed: Nov. 21, 2011

(86) PCT No.: PCT/EP2011/070519
§ 371 (c)(1),
(2), (4) Date: Jun. 19, 2013

(87) PCT Pub. No.: WO2012/084375
PCT Pub. Date: Jun. 28, 2012

(65) Prior Publication Data
US 2013/0274059 A1  Oct. 17, 2013

(30) Foreign Application Priority Data
Dec. 21, 2010 (DE) .......................... 10 2010 063 632

(51) Int. Cl.
*F16H 3/62* (2006.01)

(52) U.S. Cl.
USPC .......................................... 475/276; 475/296

(58) Field of Classification Search
CPC ..... F16H 3/62; F16H 3/66; F16H 2200/0065; F16H 2200/2012; F16H 2200/2046
USPC .............................................. 475/280
See application file for complete search history.

(56) References Cited

U.S. PATENT DOCUMENTS

| 4,395,925 A | 8/1983 | Gaus |
| 6,634,980 B1 | 10/2003 | Ziemer |

(Continued)

FOREIGN PATENT DOCUMENTS

| DE | 29 36 969 A1 | 4/1981 |
| DE | 199 49 507 A1 | 4/2001 |

(Continued)

OTHER PUBLICATIONS

Gerhard Gumpoltsberger, "Systematic Synthesis and Evaluation of Multi-stage Planetary Transmissions" Mechanical Engineering of the Technical University of Chemnitz, Jan. 22, 2007.

(Continued)

*Primary Examiner* — Edwin A Young
(74) *Attorney, Agent, or Firm* — Davis & Bujold, PLLC; Michael J. Bujold

(57) ABSTRACT

A multi-step transmission having a housing which accommodates eight shafts and four planetary gear sets, and at least six shift elements including brakes and clutches which are engaged to implement different ratios between a drive shaft and output shaft. The carrier of gearset (4) is connected to shaft (14) which is connectable, via brake (8), to the housing and, via clutch (11), to shaft (15) which is coupled to the ring gear of gearset (6). The shaft (16) connects the ring gear of gearset (5) to the sun gear of gearset (6) and is couplable, via a clutch (12), to the output shaft. The shaft (17) is connected to the ring gear of gearset (4) and the drive shaft is connectable, via clutch (13), to shaft (14) and is coupled to the carrier of gearset (5).

18 Claims, 4 Drawing Sheets

(56) References Cited

U.S. PATENT DOCUMENTS

| | | |
|---|---|---|
| 7,341,537 B2 | 3/2008 | Klemen |
| 7,549,942 B2 | 6/2009 | Gumpoltsberger |
| 7,695,398 B2 | 4/2010 | Phillips et al. |
| 7,699,743 B2 | 4/2010 | Diosi et al. |
| 8,210,981 B2 | 7/2012 | Bauknecht et al. |
| 8,277,356 B2 | 10/2012 | Hart et al. |
| 2005/0215386 A1 | 9/2005 | Haka |
| 2007/0072732 A1 | 3/2007 | Klemen |
| 2008/0070740 A1* | 3/2008 | Gumpoltsberger ........... 475/276 |
| 2008/0234093 A1* | 9/2008 | Diosi et al. .................... 475/276 |
| 2008/0274853 A1 | 11/2008 | Raghavan |
| 2008/0280723 A1* | 11/2008 | Wittkopp et al. ............. 475/276 |
| 2009/0017965 A1 | 1/2009 | Phillips et al. |
| 2009/0054194 A1 | 2/2009 | Phillips et al. |

FOREIGN PATENT DOCUMENTS

| | | |
|---|---|---|
| DE | 10 2005 010 210 A1 | 9/2006 |
| DE | 10 2006 024 442 A1 | 11/2006 |
| DE | 10 2005 032 884 A1 | 1/2007 |
| DE | 10 2006 006 637 A1 | 9/2007 |
| DE | 10 2008 015 919 A1 | 10/2008 |
| DE | 10 2008 019 136 A1 | 11/2008 |
| DE | 10 2008 031 970 A1 | 1/2009 |
| DE | 10 2008 000 428 A1 | 9/2009 |
| DE | 10 2009 047 277 A1 | 6/2011 |
| DE | 10 2009 047 278 A1 | 6/2011 |
| JP | 2001-041296 A | 2/2001 |
| JP | 2006-266389 A | 10/2006 |
| JP | 2008-215407 A | 9/2008 |
| JP | 2009-270667 A | 11/2009 |

OTHER PUBLICATIONS

German Search Report Corresponding to 10 2010 063 670.3 mailed Aug. 22, 2011.
German Search Report Corresponding to 10 2010 063 643.6 mailed Aug. 22, 2011.
German Search Report Corresponding to 10 2010 063 632.0 mailed Dec. 14, 2011.
German Search Report Corresponding to 10 2010 063 634.7 mailed Dec. 14, 2011.
International Search Report Corresponding to PCT/EP2011/070517 mailed Jan. 27, 2012.
International Search Report Corresponding to PCT/EP2011/070518 mailed Jan. 27, 2012.
International Search Report Corresponding to PCT/EP2011/070519 mailed Mar. 1, 2012.
International Search Report Corresponding to PCT/EP2011/070521 mailed Mar. 2, 2012.
Written Opinion Corresponding to PCT/EP2011/070517 mailed Jan. 27, 2012.
Written Opinion Corresponding to PCT/EP2011/070518 mailed Jan. 27, 2012.
Written Opinion Corresponding to PCT/EP2011/070519 mailed Mar. 1, 2012.
Written Opinion Corresponding to PCT/EP2011/070521 mailed Mar. 2, 2012.

* cited by examiner

| Gear | Engaged shift elements | | | | | | Trans-mission ratio i | Gear increment φ |
|---|---|---|---|---|---|---|---|---|
| | Brake | | | Clutch | | | | |
| | 8 | 9 | 10 | 11 | 12 | 13 | | |
| 1 | | × | × | × | | | 5,531 | |
| | | | | | | | | 1,678 |
| 2 | | | × | × | | × | 3,297 | |
| | | | | | | | | 1,474 |
| 3 | | × | × | | | × | 2,237 | |
| | | | | | | | | 1,383 |
| 4 | | | × | | × | × | 1,618 | |
| | | | | | | | | 1,336 |
| 5 | | × | | | × | × | 1,211 | |
| | | | | | | | | 1,211 |
| 6 | | | | × | × | × | 1,000 | |
| | | | | | | | | 1,148 |
| 7 | | × | | × | × | | 0,871 | |
| | | | | | | | | 1,192 |
| 8 | × | | | × | × | | 0,731 | |
| | | | | | | | | 1,189 |
| 9 | × | × | | | × | | 0,615 | |
| | | | | | | | | Total |
| R | × | × | × | | | | -4,717 | 8,988 |

MULTISTEP GEAR MECHANISM OF PLANETARY DESIGN

This application is a National Stage completion of PCT/EP2011/070519 filed Nov. 21, 2011, which claims priority from German patent application serial no. 10 2010 063 632.0 filed Dec. 21, 2010.

FIELD OF THE INVENTION

The invention relates to a multi-stage transmission of planetary design, particularly for a motor vehicle, having a housing, in which eight rotatable shafts and four planetary gear sets are accommodated, and with at least six shift elements which are formed by at least one brake and clutches, and by the targeted actuation thereof different transmission ratios can represented between a drive shaft and an output shaft.

BACKGROUND OF THE INVENTION

Multi-stage transmissions of this type are preferably used with automatic transmissions of motor vehicles, wherein the effective power flow through the planetary gear sets in the respective gear step is defined by a targeted actuation of the shift elements. Here, in the case of an automatic transmission, the planetary gear sets are typically additionally provided with an upstream start-up element, such as, for example, a hydrodynamic torque converter or a fluid coupling, that is subject to a slip effect and is provided optionally with a lock-up clutch.

The document, DE 10 2008 000 428 A1, discloses a multi-stage transmission of planetary design in which four planetary gear sets, and a total of eight rotatable shafts, one of which represents a drive shaft and another represents an output shaft of the multi-stage transmission, are disposed in a housing. Furthermore, there are at least six shift elements in the region of the shafts, and by the targeted actuation thereof, the power flow through the four planetary gear sets varies and thus, different transmission ratios can be represented between the drive shaft and the output shaft. By this means, a total of nine forward gears and one reverse gear can be engaged.

SUMMARY OF THE INVENTION

The objective of the present invention is to propose a multi-stage transmission of the initially named type in which at least nine forward gears and one reverse gear can be represented and in which particularly the construction expense is minimized with respect to the weight and the production expense. In addition, it should be possible to represent a favorable transmission ratio range, and the loads to the individual transmission elements should be minimized. Finally, a high gearing efficiency should be attainable.

Accordingly, a multi-stage transmission in a planetary design according to the invention is proposed, in which a drive shaft and an output shaft and a further six rotatable shafts and four planetary gear sets are accommodated in a housing. The planetary gear sets, viewed here in the axial direction, are disposed in the sequence of first planetary gear set, second planetary gear set, third planetary gear set, fourth planetary gear set, wherein each planetary gear set is preferably designed as a minus planetary gear set. However it is also conceivable to convert individual or several minus planetary gear sets into plus planetary gear sets at places where this is allowed for by the connectability, if at the same time, a carrier connection and a ring gear connection are exchanged, and the value of the standard transmission ratio is increased by one.

As is well known, a simple minus planetary gear set comprises a sun gear, a ring gear, and a carrier which rotatably supports the planetary gears, which each mesh with the sun gear and the ring gear. In the case of a fixed carrier, a direction of rotation of the ring gear is counter to that of the sun gear.

In contrast to this, a simple plus planetary gear set comprises a sun gear, a ring gear and a carrier, which rotatably supports inner and outer planetary gears. Here, all inner planetary gears mesh with the sun gear, and all outer planetary gears mesh with the ring gear, wherein additionally each of the inner planetary gears is in engagement with an outer planetary gear. In the case of a fixed carrier, the ring gear has the same direction of rotation as the sun gear.

According to the invention, a carrier of a first planetary gear set is connected to a third shaft, which is fixed to the housing via a first brake and additionally can be connected to a fourth shaft by means of a first clutch. Furthermore, the fourth shaft is coupled to a ring gear of a third planetary gear set, wherein a fifth shaft connects a ring gear of a second planetary gear set to a sun gear of the third planetary gear set, and in addition can be coupled to the output shaft via a second clutch. Moreover, a sixth shaft is connected to a ring gear of the first planetary gear set, and the drive shaft can be connected to the third shaft via a third clutch, and coupled to a carrier the second planetary gear set.

According to one embodiment of the invention, the sixth shaft is also connected to a sun gear of the second planetary gear set and a carrier of the third planetary gear set. In addition, a sun gear of the first planetary gear set is coupled to a seventh shaft, which can be fixed to the housing by means of a second brake.

In a further development of this embodiment, the fourth shaft is additionally connected to a sun gear of a fourth planetary gear set, while a ring gear of this fourth planetary gear set is coupled to an eighth shaft, which can be fixed to the housing via a third brake. Finally, the output shaft is coupled, moreover, to a carrier of the fourth planetary gear set.

In this case, a first forward gear results from engaging the second and the third brakes and the first clutch, whereas a second forward gear is engaged by actuating the third brake, and the first and third clutch. A third forward gear can be selected by engaging the second and third brake, and the third clutch. Furthermore, a fourth forward gear results from actuating the third brake, and the second and third clutch; a fifth forward gear results from engaging the second brake, and the second and third clutch. A sixth forward gear is engaged by actuating all clutches; a seventh forward gear can be selected by engaging the second brake and the second and third clutch. Furthermore, an eighth forward gear results from actuating the first brake, and the first and second clutch, whereas a ninth forward gear is selected by engaging the first and second brake, and the second clutch. Finally, a reverse gear results from engaging all brakes.

According to an alternate further development of this embodiment, the fourth shaft is additionally connected to a sun gear of a fourth planetary gear set, while furthermore the output shaft can be connected via a fourth clutch to an eighth shaft, which is coupled to the carrier of the fourth planetary gear set. Finally, a ring gear of the fourth planetary gear set is connected to the housing in a rotationally fixed manner.

In the case of such a design, a first forward gear results from engaging the second brake, and the first and fourth clutch, whereas a second forward gear is selected by actuating the first, third and fourth clutch. A third forward gear can be selected by engaging the second brake, and the third of fourth clutch. Furthermore, a fourth forward gear results from actuating the second, third and fourth clutch; a fifth forward gear results from engaging the second brake, and the second and third clutch. A sixth forward gear is engaged by actuating the first, second and third clutch; a seventh forward gear can be selected by engaging the second brake, and the first and second clutch. Further, an eighth forward gear results from actuating the first brake, and the first and second clutch, whereas a ninth forward gear is shifted to by engaging all brakes and the second clutch. Finally, a reverse gear results from engaging all brakes and the fourth clutch.

According to a further embodiment of the invention, the fourth shaft can furthermore be releasably connected by means of a fourth clutch to an eighth shaft, which is coupled to a sun gear of a fourth planetary gear set, whose carrier is connected to the output shaft and whose ring gear is connected to the housing in a rotationally fixed manner.

In the case of this embodiment, a first forward gear results from engaging the second brake, and the first and fourth clutch, whereas a second forward gear is engaged by actuating the first, third and fourth clutch. A third forward gear can be selected by engaging the second brake, and the third of fourth clutch. Furthermore, a fourth forward gear results from actuating the second, third and fourth clutch; a fifth forward gear results from engaging the second brake, and the second and third clutch. In addition, a sixth forward gear is shifted to by actuating the first, second and third clutch; a seventh forward gear can be selected by engaging the second brake, and the first and second clutch. Furthermore, an eighth forward gear results from engaging the first brake, and the first and second clutch, whereas a ninth forward gear can be shifted to by engaging all brakes, and the second clutch. Finally, a reverse gear results from engaging all brakes and the fourth clutch.

According to an alternative embodiment of the invention, the sixth shaft can be connected additionally by means of a fourth clutch to a seventh shaft, which connects a sun gear of the second planetary gear set to a carrier of the third planetary gear set. Furthermore, a sun gear of the first planetary gear set is coupled to the housing in a rotationally fixed manner.

In a further development of this embodiment, the fourth shaft is also connected to a sun gear of a fourth planetary gear set, wherein a carrier of this fourth planetary gear set is coupled to the output shaft, and a ring gear of the fourth planetary gear set is coupled to an eighth shaft, which can be fixed to the housing via a second brake.

In this case, a first forward gear results from engaging the second brake and the first and fourth clutch, whereas a second forward gear is engaged by actuating the second brake, and the first and third clutch. A third forward gear can be selected by engaging the second brake, and the third and fourth clutch. Furthermore, a fourth forward gear results from actuating the second brake, and the second and third clutch; a fifth forward gear results from engaging the second, third and fourth clutch. In addition, a sixth forward gear is engaged by actuating the first, second and third clutch; a seventh forward gear can be selected by engaging the first, second and fourth clutch. Furthermore, an eighth forward gear results from actuating the first brake, and the first and second clutch, whereas a ninth forward gear is selected by engaging the first brake, and the second and fourth clutch. Finally, reverse gear results from engaging all brakes, and the fourth clutch.

According to a further embodiment of the invention, the fourth shaft is additionally connected to a sun gear of the fourth planetary gear set, wherein a carrier of this fourth planetary gear set is coupled to an eighth shaft, which can be connected to the output shaft via the fifth clutch. Finally, a ring gear of the fourth planetary gear set is coupled to the housing in a rotationally fixed manner.

In the case of this embodiment, a first forward gear results from engaging the first, fourth and fifth clutch, subsequent to this, a second forward gear is engaged by actuating the first, third and fifth clutch. A further, third forward gear can be selected by engaging the third, fourth and fifth clutch. Furthermore, a fourth forward gear results from actuating the second, third and fifth clutch; a fifth forward gear results from engaging the second, third and fourth clutch. In addition, a sixth forward gear is engaged by actuating the first, second and third clutch; a seventh forward gear can be selected by engaging the first, second and fourth clutch. Furthermore, an eighth forward gear results from actuating the first brake, and the first and second clutch, whereas a ninth forward gear is selected by engaging the first brake, and the second and fourth clutch. Finally, reverse gear results from engaging the first brake, and the fourth and fifth clutch.

According to a further embodiment of a multi-stage transmission according to the invention, the fourth shaft can additionally be connected by means of a fifth clutch to an eighth shaft, which is coupled to a sun gear of a fourth planetary gear set, wherein a carrier of this fourth planetary gear set is connected to the output shaft and a ring gear of the fourth planetary gear set is connected to the housing in a rotationally fixed manner.

In this case a first forward gear results from engaging the first, fourth and fifth clutch, whereas a second forward gear is selected by engaging the first, third and fifth clutch. A subsequent third gear is shifted to by engaging the third, fourth and fifth clutch. Furthermore, a fourth forward gear results from actuating the second, third and fifth clutch; a fifth forward gear results from engaging the second, third and fourth clutch. A sixth forward gear is shifted to by actuating the first, second and third clutch; a seven forward gear can be selected by engaging the first, second and fourth clutch. Furthermore, an eighth forward gear results from actuating the first brake, and the first and second clutch, whereas a ninth forward gear is selected by engaging the first brake, and the second and fourth clutch. Finally, reverse gear results from engaging the first brake, and the fourth and fifth clutch.

By means of the design of a multi-stage transmission according to the invention it is possible to implement a total of ten selectable gears with a low number of components, and thus to keep the production costs and the weight low. In addition, transmission ratios, particularly suitable for passenger vehicles, and a broad transmission ratio range of the multi-stage transmission result, which leads to an increase in driving comfort and a decrease in fuel consumption.

Furthermore, a multi-stage transmission according to the invention is characterized by low absolute and relative rotational speeds, and low planetary gear set torques and shift element torques, which has a positive effect on the dimensioning and the service life of the transmission. In addition, a good transmission ratio series, particularly a slightly progressive transmission ratio series, can be attained, as well as good gearing efficiencies.

BRIEF DESCRIPTION OF THE DRAWINGS

Additional measures improving the invention are represented in the following in more detail together with the description of preferred embodiments of the invention. Shown are.

DETAILED DESCRIPTION OF THE PREFERRED EMBODIMENTS

Figures 1, 2:
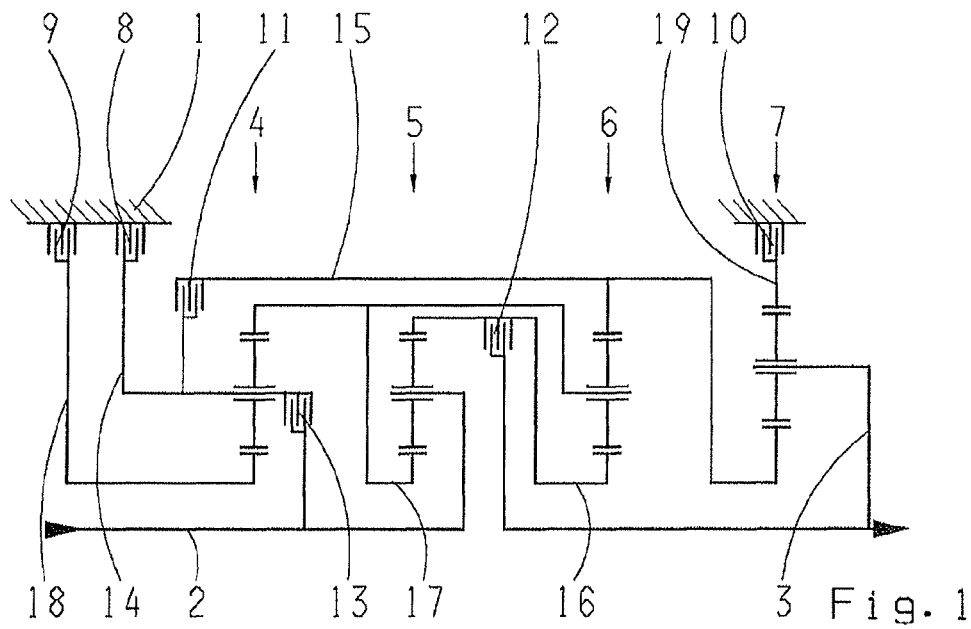
FIG. 1 a schematic view of a first preferred embodiment of a multi-stage transmission according to the invention.
FIG. 2 an example of a shift pattern for a multi-stage transmission according to FIG. 1.

FIG. 1 shows a schematic view of a first embodiment of the multi-stage transmission according to the invention in which a drive shaft 2, and output shaft 3, and four planetary gear sets 4, 5, 6 and 7 are accommodated in a housing 1. Here, the planetary gear sets 4, 5, 6 and 7 are designed as minus planetary gear sets, wherein however, it is also conceivable to implement at least one of the planetary gear sets 4, 5, 6 and 7 as a plus planetary gear set, if at the same time a respective carrier connection and a ring gear connection are exchanged, and the value of the standard transmission gear ratio is increased by one compared to the embodiment as a minus planetary gear set.

As is further evident from FIG. 1, the multi-stage transmission according to the invention additionally comprises a total of six shift elements, namely three brakes 8, 9 and 10, and three clutches 11, 12 and 13, which are each designed as multi-disk shift elements. A spatial disposition of these shift elements can be arbitrary, and is limited only by the dimensions and the outer shape. Additionally, an embodiment as claw shift elements is also conceivable.

By means of the targeted actuation of the shift elements, a total of nine forward gears and one reverse gear can be represented between the drive shaft 2 and the output shaft 3, in that the power flow through the four planetary gear sets 4, 5, 6 and 7 is varied.

Further, the multi-stage transmission according to the invention has a total of eight rotatable shafts, which, aside from the drive shaft 2 and the output shaft 3, are a third shaft 14, a fourth shaft 15, a fifth shaft 16, a sixth shaft 17, a seventh shaft 18, and an eighth shaft 19.

As further seen in FIG. 1, the third shaft 14 is coupled to a carrier of the first planetary gear set 4, and in addition can be fixed to the housing 1 using the first brake 8. In addition, the third shaft 14 can be releasably connected via the first clutch 11 to the fourth shaft 15, which in further progression connects a ring gear of the third planetary gear set 6 to a sun gear of the fourth planetary gear set 7.

The fifth shaft 16 is connected to a ring gear of the second planetary gear set 5 and to a sun gear of the third planetary gear set 6, and additionally can be connected by means of the second clutch 12 to the output shaft 3, which is additionally coupled to a carrier of the fourth planetary gear set 7. Additionally, the sixth shaft 17 connects a ring gear of the first planetary gear set 4 to a sun gear of the second planetary gear set 5 and to a carrier of the third planetary gear set 6.

As also seen in FIG. 1, the drive shaft 2 is coupled to a carrier of the second planetary gear set 5 and additionally can be connected to the third shaft 14 by means of the third clutch 13. Furthermore, a sun gear of the first planetary gear set 4 is coupled to a seventh shaft 18, which can be fixed to the housing 1 using the second brake 9. Finally, a ring gear of the fourth planetary gear set 7 is in operative connection with an eighth shaft 19, which can also be fixed to the housing 1 using the further, third brake 10.

FIG. 2 highlights an example shifting pattern of a multi-stage transmission according to FIG. 1. Here, for each gear three of the six shift elements are engaged, and during a change into the adjacent gears, in each case, the state of two shift elements is changed. In addition, the example shift pattern shows the particular transmission ratios i of the individual gear steps and the gear increments φ to the respectively next higher gear as an example. FIG. 2 also shows a transmission ratio spread of 8.988.

In the case of the example embodiment according to FIG. 1, the first forward gear is represented by engaging the second brake 9 and the third brake 10, and the first clutch 11. In order to shift into the next higher, second forward gear, the second brake 9 is then disengaged and the third clutch 13 is engaged. Starting from the second forward gear, the third gear is shifted to by disengaging the first clutch 11 and engaging the second brake 9. Then, for upshifting into the fourth forward gear, the second brake 9 is disengaged again, and the second clutch 12 is actuated. Starting from the fourth forward gear, for selecting the fifth forward gear, the third brake 10 is now disengaged and the second brake 9 is actuated, whereas for a further upshift into the sixth forward gear, the second brake 9 is again disengaged and the first clutch 11 is engaged. Then, for shifting the seventh forward gear, the third clutch 13 is disengaged and the second brake 9 is actuated, whereas for selecting the eighth forward gear, the second brake is disengaged again and the first brake 8 is engaged. Finally, for upshifting into the ninth forward gear, the first clutch 11 is disengaged and the second brake 9 is actuated. In contrast, the reverse gear results from engaging all three brakes 8, 9 and 10.

Figure 3:
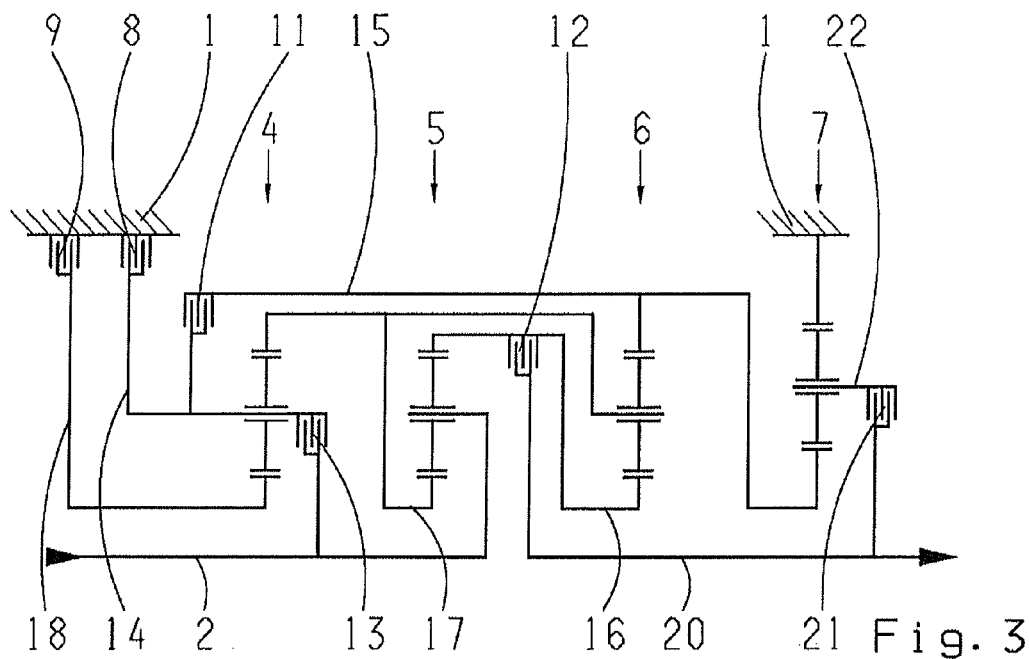
FIG. 3 a schematic view of a second preferred embodiment of a multi-stage transmission according to the invention.

FIG. 3 shows a further, second embodiment of the multi-stage transmission according to the invention. This differs from the embodiment according to FIG. 1 in that an output shaft 20, along with being connected to the fifth shaft 16 by means of the second clutch 12, can be connected via a fourth clutch 21 to an eighth shaft 22. Here, this eighth shaft 22 is also connected to a carrier of the fourth planetary gear set 7. In addition, a ring gear of the fourth planetary gear set 7 is connected to the housing 1 in a rotationally fixed manner.

The design according to the second embodiment according to FIG. 3, is effectively the same as the first embodiment according to FIG. 1, such that in the individual gears the transmission ratios i, and the gear increments φ according to the example shift pattern in FIG. 2 can be attained. The shifting of the individual gears also differs with respect to the description of FIG. 2 only in that instead of the third brake 10 in FIG. 1, the fourth clutch 21 in FIG. 3 is actuated in each case.

Figure 4:
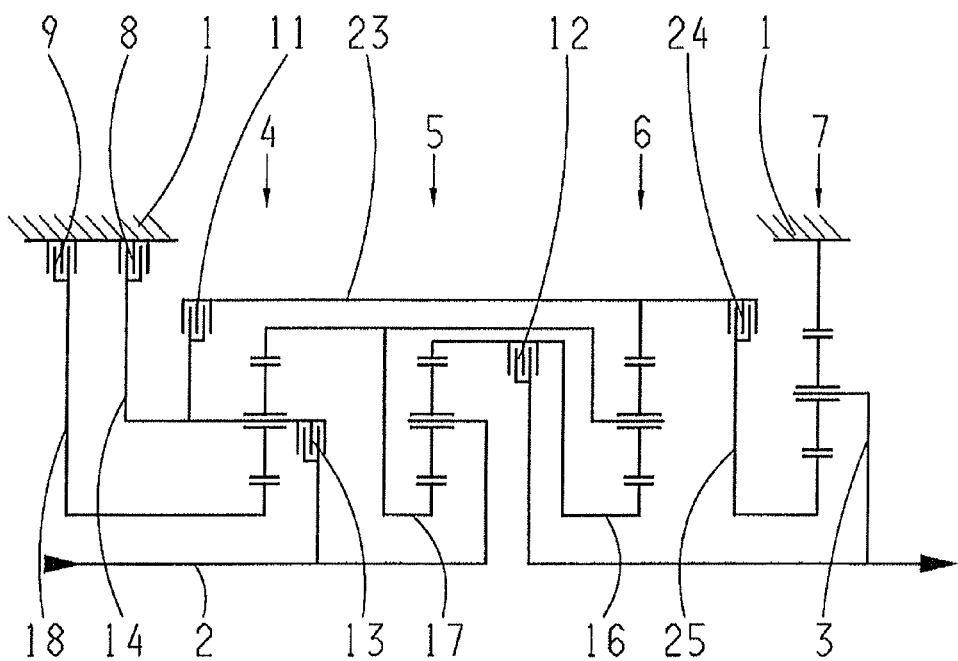
FIG. 4 a schematic view of a further, third preferred embodiment of a multi-stage transmission according to the invention.

In addition, FIG. 4 schematically shows a further, third embodiment of the multi-stage transmission according to the invention. This embodiment differs from the first embodiment according to FIG. 1, in that a fourth shaft 23, along with a connection to the ring gear of the third planetary gear set 6 and a possible coupling via the first clutch 11 to the third shaft 14, can be connected to an eighth shaft 25, by means of a fourth clutch 24. This eighth shaft 25 is additionally coupled to a sun gear of the fourth planetary gear set 7. Finally, a ring gear of the fourth planetary gear set 7 is connected to the housing 1 in a rotationally fixed manner.

In the case of the third embodiment according to FIG. 4 as well, the transmission ratios i of the individual gear steps and the gear increments φ between the gears can again be attained according to the example shift pattern according to FIG. 2. With respect to shifting the individual gears, the present variant differs with respect to the shift pattern in FIG. 2 in that instead of the third brake 10 in FIG. 1, a fourth clutch 24 in FIG. 4 is actuated.

Figure 5:
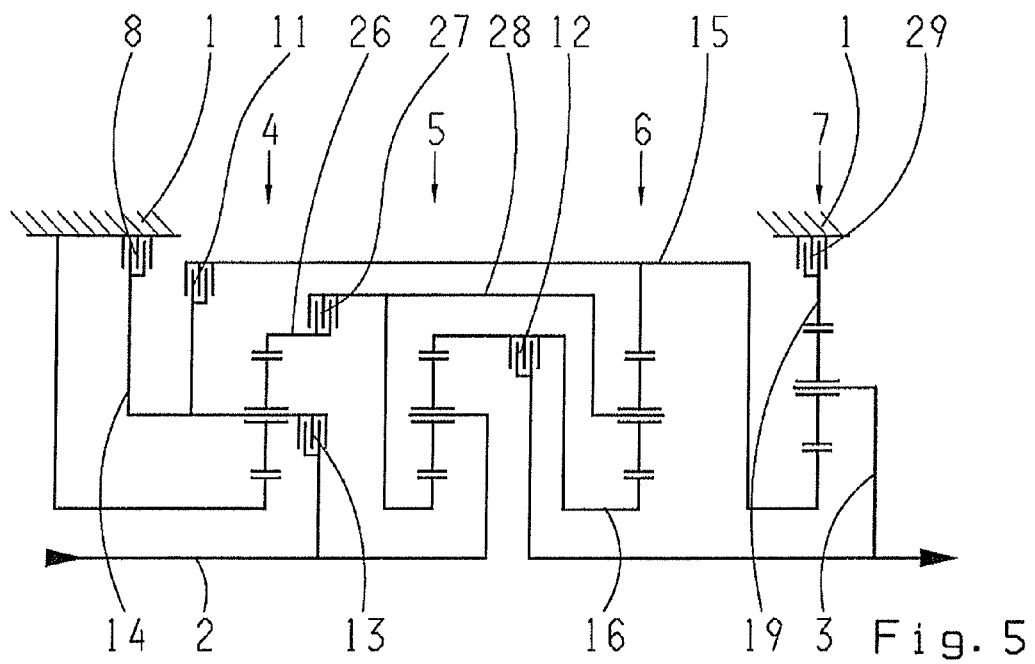
FIG. 5 a schematic view of a further, fourth preferred embodiment of a multi-stage transmission according to the invention.

FIG. 5 shows a further, fourth preferred embodiment of the multi-stage transmission according to the invention. Here, differing from the variant described in FIG. 1, a sixth shaft 26, in addition to a coupling to a ring gear of the first planetary gear set 4, can be connected via a fourth clutch 27 to a seventh shaft 28, which here, in further progression, connects a sun gear of the second planetary gear set 5 to a carrier of the third planetary gear set 6. In addition, the eighth shaft 19, connected to a ring gear of the fourth planetary gear set 7, can be fixed to the housing 1 via a second brake 29. Finally, a sun gear of the first planetary gear set 4 is connected to the housing 1 in a rotationally fixed manner.

The transmission ratios that can be attained in the case of this embodiment, and the gear increments φ, again correspond to the example values of the shift pattern according to FIG. 2. With respect to actuating the shift elements for shifting the individual gears, in the case of the embodiment according to FIG. 5, the shift pattern according to FIG. 2 is modified in that instead of the second brake 9 in FIG. 1, the fourth clutch 27 in FIG. 5 is actuated, and instead of the third brake 10 in FIG. 1, the second brake 29 in FIG. 5 is actuated.

Figure 6:
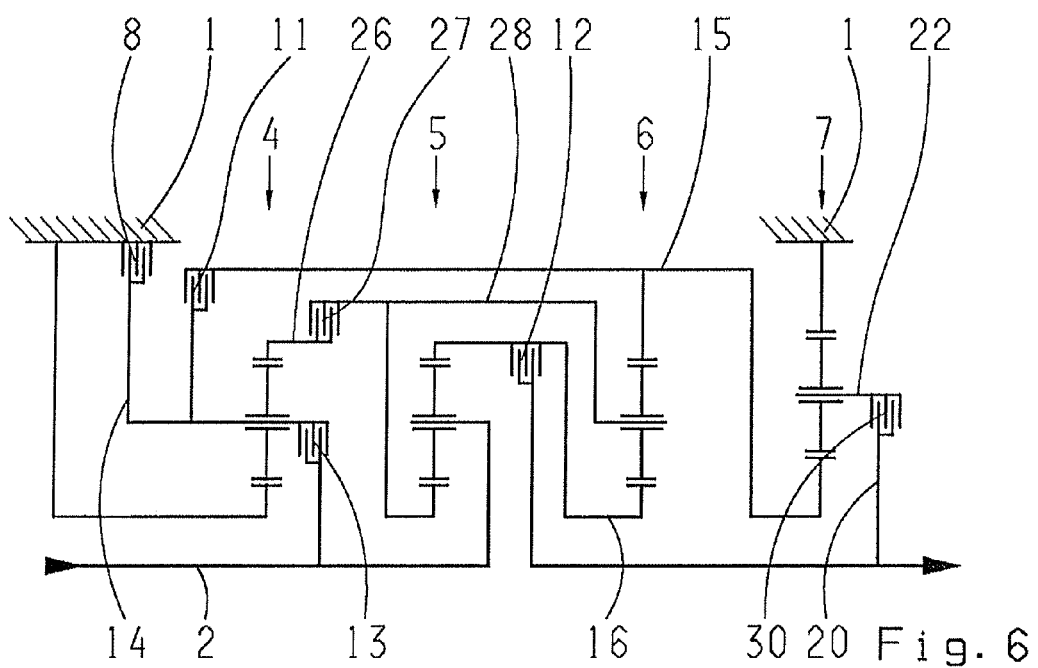
FIG. 6 a schematic view of a fifth preferred embodiment of the invention.

In addition, FIG. 6 shows a schematic representation of a further, fifth preferred embodiment of a multi-stage transmission according to the invention. Here, in contrast to the multi-stage transmission shown in FIG. 1, a sixth shaft 26, as is already the case with the embodiment according to FIG. 5, can be releasably connected to a seventh shaft 28 by means of a fourth clutch 27, wherein this seventh shaft 28 connects a sun gear of the second planetary gear set 5 to a carrier of the third planetary gear set 6. In addition, an output shaft 20, along with a possible coupling via a second clutch 12 to the fifth shaft 16, can be connected by means of a fifth clutch 30 to an eighth shaft 22, which is coupled in further progression to a carrier of the fourth planetary gear set 7. Finally, both a sun gear of the first planetary gear set 4 and a ring gear of the fourth planetary gear set 7 are each connected to the housing 1 in a rotationally fixed manner.

As with the previous cases, the attainable transmission ratios i and the gear increments φ of the variant according to FIG. 6 correspond to the values of the example shift pattern in FIG. 2. For shifting the individual gears, the example shift pattern from FIG. 2 is now modified in that, instead of the second brake 9 in FIG. 1, the fourth clutch 27 in FIG. 6 is actuated, and instead of the third brake 10 in FIG. 1, the fifth clutch 30 in FIG. 6 is actuated.

Figure 7:
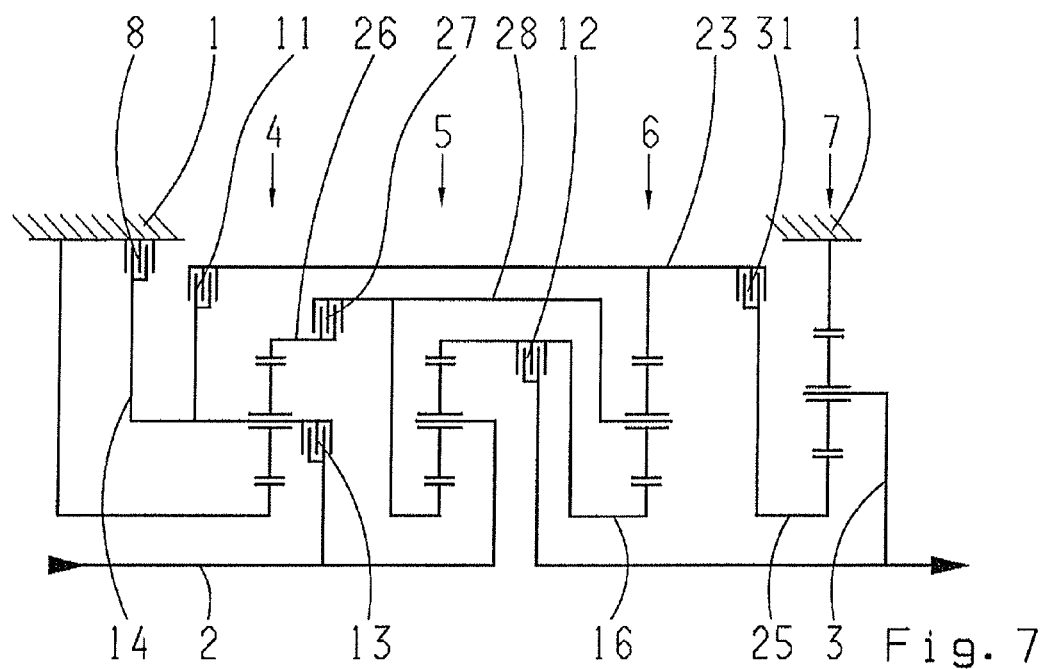
FIG. 7 a schematic view of a sixth preferred embodiment of a multi-stage transmission according to the invention.

Finally, FIG. 7 shows a sixth preferred embodiment of a multi-stage transmission according to the invention. This embodiment differs from the multi-stage transmission according to FIG. 1 in that a sixth shaft 26, as is already the case with the variants according to FIG. 5 and FIG. 6, along with a coupling to a ring gear of the first planetary gear set 4, can be coupled by means of a fourth clutch 27 to a seventh shaft 28, which connects a sun gear of the second planetary gear set 5 to a carrier of the third planetary gear set 6. In addition, a fourth shaft 23 can be releasably connected via a fifth clutch 31 to an eighth shaft 25, which is also coupled to a sun gear of the fourth planetary gear set 7. Finally, both a sun gear of the first planetary gear set 4 and a ring gear of the fourth planetary gear set 7 are each connected to the housing 1 in a rotationally fixed manner.

The embodiment according to FIG. 7 is effectively the same as the variant according to FIG. 1 such that with respect to the transmission ratios i and the gear increments φ, the same example values of the shift pattern according to FIG. 2 are attained. With respect to shifting the individual gears, the shift pattern according to FIG. 2 is modified in that instead of the second brake 9 in FIG. 1, the fourth clutch 27 in FIG. 7 is actuated, and instead of the third brake 10 in FIG. 1, the fifth clutch 31 in FIG. 7 is actuated.

Using the design of a multi-stage transmission according to the invention, an automatic transmission can be attained having low construction costs and low weight. In addition, with the multi-stage transmission according to the invention there are low absolute and relative rotational speeds and low torque at the planetary gear sets and the shift elements. Finally, a good transmission ratio series and good gearing efficiency is attained.

Here the multi-stage transmission according to the invention is preferably suited for a standard longitudinal installation, however, a front transverse design is also conceivable.

In addition, in the scope of the invention, if necessary the drive shaft 2 can be separated from a drive engine of the motor vehicle using a clutch element, wherein this clutch element can be configured as a hydrodynamic converter, a hydrodynamic clutch, a dry or wet start-up clutch, a magnetic powder clutch or as a centrifugal clutch. Furthermore it is also possible to dispose such a start-up element behind the multi-stage transmission, such that the drive shaft 2 is continuously connected to a crankshaft of the drive engine. In both cases, is also conceivable to place a torsional-vibration damper between the engine and the transmission.

Furthermore, a wear-free brake, for instance, a hydraulic or electric retarder, can be disposed on each shaft, preferably on the drive shaft 2 and the output shaft 3 or 20, which is particularly advantageous for use in commercial vehicles. Also, each of the shafts can represent a power take-off drive of an additional aggregate.

Obviously, any structural embodiment, in particular any spatial disposition of the planetary gear sets 4, 5, 6, and 7 and the shift elements individually and relative to each other, and insofar as it is technically expedient, falls under the scope of protection of the present claims, without influencing the function of the transmission as specified in the claims, even if these embodiments are not explicitly represented in the figures or in the description.

REFERENCE CHARACTERS 1 housing
2 drive shaft
3 output shaft
4 first planetary gear set
5 second planetary gear set
6 third planetary gear set
7 fourth planetary gear set
8 first brake
9 second brake
10 third brake
11 first clutch
12 second clutch
13 third clutch
14 third shaft
15 fourth shaft
16 fifth shaft
17 sixth shaft
18 seventh shaft
19 eighth shaft
20 output shaft
21 fourth clutch
22 eighth shaft
23 fourth shaft 24 fourth clutch
25 eighth shaft
26 sixth shaft
27 fourth clutch
28 seventh shaft
29 second brake
30 fifth clutch
31 fifth clutch

The invention claimed is:

1. A multi-step transmission, of a planetary design, comprising:
a housing accommodating shafts, first, second, third and fourth planetary gear sets (4, 5, 6, 7), and at least six shift elements comprising at least one brake (8, 9, 10; 8, 9; 8, 29; 8) and clutches (11, 12, 13; 11, 12, 13, 21; 11, 12, 13, 24; 11, 12, 13, 27; 11, 12, 13, 27, 30; 11, 12, 13, 27, 31), and selective engagement of the at least six shift elements implements different transmission ratios between a drive shaft (2) and an output shaft (3; 20),
a carrier of a first planetary gear set (4) being connected to a third shaft (14) and the third shaft (14) is connectable, via a first brake (8), to the housing (1) and the third shaft (14) also being connectable, via a first clutch (11), to a fourth shaft (15; 23) and the fourth shaft (15; 23) being coupled to a ring gear of a third planetary gear set (6),
a fifth shaft (16) connecting a ring gear of a second planetary gear set (5) to a sun gear of the third planetary gear set (6) and the fifth shaft (16) being connectable, via a second clutch (12), to the output shaft (3; 20),
a sixth shaft (17; 26) being connected to a ring gear of the first planetary gear set (4), and
the drive shaft (2) being connectable, via a third clutch (13), to the third shaft (14), and the drive shaft (2) being coupled to a carrier of the second planetary gear set (5).

2. The multi-stage transmission according to claim 1, wherein the sixth shaft (17) is connected to a sun gear of the second planetary gear set (5) and to a carrier of the third planetary gear set (6), and
a sun gear of the first planetary gear set (4) is coupled to a seventh shaft (18) and the seventh shaft (18) is connectable, via a second brake (9), to the housing (1).

3. The multi-stage transmission according to claim 2, wherein the fourth shaft (15) is connected to a sun gear of a fourth planetary gear set (7),
a ring gear of the fourth planetary gear set (7) is coupled to an eighth shaft (19) and the eighth shaft (19) is connectable, via a third brake (10), to the housing (1), and
the output shaft (3) is coupled to a carrier of the fourth planetary gear set (7).

4. The multi-stage transmission according to claim 3, wherein a first forward gear is obtained by engaging the second brake (9) and the third brake (10), and the first clutch (11);
a second forward gear is obtained by engaging the third brake (10), and the first clutch (11) and the third clutch (13);
a third forward gear is obtained by engaging the second brake (9) and the third brake (10), and the third clutch (13);
a fourth forward gear is obtained by engaging the third brake (10), and the second clutch (12) and the third clutch (13);
a fifth forward gear is obtained by engaging the second brake (9), and the second clutch (12) and third clutch (13);
a sixth forward gear is obtained by engaging the first, the second, and the third clutches (11, 12, 13);
a seventh forward gear is obtained by engaging the second brake (9), and the first clutch (11) and the second clutch (12);
an eighth forward gear is obtained by engaging the first brake (8), and the first clutch (11) and the second clutch (12);
a ninth forward gear is obtained by engaging the first brake (8) and the second brake (9), and the second clutch (12); and a reverse gear is obtained by engaging the first, the second, and the third brakes (8, 9, 10).

5. The multi-stage transmission according to claim 2, wherein the fourth shaft (15) is additionally connected to a sun gear of a fourth planetary gear set (7),
the output shaft (20) is releasably connectable, via a fourth clutch (21), to an eighth shaft (22) and the eighth shaft (22) is coupled to a carrier of the fourth planetary gear set (7), and
a ring gear of the fourth planetary gear set (7) is fixedly connected to the housing (1).

6. The multi-stage transmission according to claim 5, wherein a first forward gear is obtained by engaging the second brake (9), and the first clutch (11) and the fourth clutch (21);
a second forward gear is obtained by engaging the first clutch (11), the third clutch (13) and the fourth clutch (21):
a third forward gear is obtained by engaging the second brake (9), and the third clutch (13) and the fourth clutch (21);
a fourth forward gear is obtained by engaging the second clutch (12), the third clutch (13) and the fourth clutch (21);
a fifth forward gear is obtained by engaging the second brake (9), and the second clutch (12) and the third clutch (13);
a sixth forward gear is obtained by engaging the first clutch (11), the second clutch (12) and the third clutch (13);
a seventh forward gear is obtained by engaging the second brake (9), and the first clutch (11) and the second clutch (12);
an eighth forward gear is obtained by engaging the first brake (8), and the first clutch (11) and the second clutch (12);
a ninth forward gear is obtained by engaging the first and the second brakes (8, 9) and the second clutch (12); and
a reverse gear is obtained by engaging the first and the second brakes (8, 9), and the fourth clutch (21).

7. The multi-stage transmission according to claim 2, wherein the fourth shaft (23) is releasably connectable, via a fourth clutch (24), to an eighth shaft (25) and the eighth shaft (25) is coupled to a sun gear of the fourth planetary gear set (7),
a carrier of the fourth planetary gear set (7) is connected to the output shaft (3), and
a ring gear of the fourth planetary gear set (7) is fixedly connected to the housing (1).

8. The multi-stage transmission according to claim 7, wherein a first forward gear is obtained by engaging the second brake (9), and the first clutch (11) and the fourth clutch (24);
a second forward gear is obtained by engaging the first clutch (11), the third clutch (13) and the fourth clutch (24);
a third forward gear is obtained by engaging the second brake (9), and the third clutch (13) and the fourth clutch (24);

a fourth forward gear is obtained by engaging the second clutch (12), the third clutch (13), and the fourth clutch (24);

a fifth forward gear is obtained by engaging the second brake (9), and the second clutch (12) and the third clutch (13);

a sixth forward gear is obtained by engaging the first clutch (11), the second clutch (12) and the third clutch (13);

a seventh forward gear is obtained by engaging the second brake (9), and the first clutch (11) and the second clutch (12);

an eighth forward gear is obtained by engaging the first brake (8), and the first clutch (11) and the second clutch (12);

a ninth forward gear is obtained by engaging the first and the second brakes (8, 9), and the second clutch (12); and a reverse gear is obtained by engaging the first and the second brakes (8, 9) and the fourth clutch (24).

9. The multi-stage transmission according to claim 1, wherein a seventh shaft (28) connects a sun gear of the second planetary gear set (5) to a carrier of the third planetary gear set (6) and the sixth shaft (26) is connectable, via a fourth clutch (27), to the seventh shaft (28), and a sun gear of the first planetary gear set (4) is fixedly coupled to the housing (1).

10. The multi-stage transmission according to claim 9, wherein the fourth shaft (15) is connected to a sun gear of the fourth planetary gear set (7), a carrier of the fourth planetary gear set (7) is coupled to the output shaft (3), and a ring gear of the fourth planetary gear set (7) is coupled to an eighth shaft (19) and the eighth shaft (19) is connectable, via a second brake (29), to the housing (1).

11. The multi-stage transmission according to claim 10, wherein a first forward gear is obtained by engaging the second brake (29), and the first clutch (11) and the fourth clutch (27);

a second forward gear is obtained by engaging the second brake (29), and the first clutch (11) and the third clutch (13);

a third forward gear is obtained by engaging the second brake (29), and the third clutch (13) and the fourth clutch (27);

a fourth forward gear is obtained by engaging the second brake (29), and the second clutch (12) and the third clutch (13);

a fifth forward gear is obtained by engaging the second clutch (12), the third clutch (13) and the fourth clutch (27);

a sixth forward gear is it obtained by engaging the first clutch (11), the second clutch (12), and the third clutch (13);

a seven forward gear is obtained by engaging the first clutch (11), the second clutch (12) and the fourth clutch (27);

an eighth forward gear is obtained by engaging the first brake (8), and the first clutch (11) and the second clutch (12);

a ninth forward gear is obtained by engaging the first brake (8) and the second clutch (12) and the fourth clutch (27); and a reverse gear is obtained by engaging the first and the second brakes (8, 29), and the fourth clutch (27).

12. The multi-stage transmission according to claim 9, wherein the fourth shaft (15) is connected to a sun gear of the fourth planetary gear set (7), a carrier of the fourth planetary gear set (7) is coupled to an eighth shaft (22) and the eighth shaft (22) is connectable, via a fifth clutch (30), to the output shaft (20), and a ring gear of the fourth planetary gear set (7) is fixedly coupled to the housing (1).

13. The multi-stage transmission according to claim 12, wherein a first forward gear is obtained by engaging the first clutch (11), the fourth clutch (27) and the fifth clutch (30);

a second forward gear is obtained by engaging the first clutch (11), the third clutch (13) and the fourth clutch (30);

a third forward gear is obtained by engaging the third clutch (13), the fourth clutch (27) and the fifth clutch (30);

a fourth forward gear is obtained by engaging the second clutch (12), the third clutch (13) and the fifth clutch (30);

a fifth forward gear is obtained by engaging the second clutch (12), the third clutch (13) and the fourth clutch (27);

a sixth forward gear is obtained by engaging the first clutch (11), the second clutch (12) and the third clutch (13);

a seventh forward gear is obtained by engaging the first clutch (11), the second clutch (12) and the fourth clutch (27);

an eighth forward gear is obtained by engaging the first brake (8), and the first clutch (11) and the second clutch (12);

a ninth forward gear is obtained by engaging the first brake (8), and the second clutch (12) and the fourth clutch (27); and a reverse gear is obtained by engaging the first brake (8), and the fourth clutch (27) and the fifth clutch (30).

14. The multi-stage transmission according to claim 9, wherein the fourth shaft (23) is connectable, via a fifth clutch (31), to an eighth shaft (25) and the eighth shaft (25) is coupled to a sun gear of the fourth planetary gear set (7), a carrier of the fourth planetary gear set (7) is connected to the output shaft (3), and a ring gear of the fourth planetary gear set (7) is fixedly connected to the housing (1).

15. The multi-stage transmission according to claim 14, wherein a first forward gear is obtained by engaging the first clutch (11), the fourth clutch (27) and the fifth clutch (31);

a second forward gear is obtained by engaging the first clutch (11), the third clutch (13) and the fifth clutch (31);

a third forward gear is obtained by engaging the third clutch (13), the fourth clutch (27) and the fifth clutch (31);

a fourth forward gear is obtained by engaging the second clutch (12), the third clutch (13) and the fifth clutch (31);

a fifth forward gear is obtained by engaging the second clutch (12), the third clutch (13) and the fourth clutch (27);

a sixth forward gear is obtained by engaging the first clutch (11), the second clutch (12) and the third clutch (13);

a seventh forward gear is obtained by engaging the first clutch (11), the second clutch (12) and the fourth clutch (27);

an eighth forward gear is obtained by engaging the first brake (8), and the first clutch (11) and the second clutch (12);

a ninth forward gear is obtained by engaging the first brake (8), and the second clutch (12) and the fourth clutch (27); and a reverse gear is obtained by engaging the first brake (8), and the fourth clutch (27) and the fifth clutch (31).

16. The multi-stage transmission according to claim 1, wherein at least one of the first, the second, the third, and the fourth planetary gear sets is a minus planetary gear set.

17. A multi-step transmission of planetary design for a motor vehicle, the multistep transmission comprising:
a housing accommodating:
a drive shaft (2), an output shaft (3; 20) and third, fourth, fifth, sixth, seventh, and eighth rotatable shafts;
first, second, third, and fourth planetary sets (4, 5, 6, 7) with each of the first planetary gear set (4), the second planetary gear set (5), the third planetary gear set (6), and the fourth planetary gear set (7) comprising a sun gear, a ring gear and a carrier;
and at least six shift elements comprising at least a first brake (8, 9, 10; 8, 9; 8, 29; 8) and at least first, second, and third clutches (11, 12, 13; 11, 12, 13, 21; 11, 12, 13, 24; 11, 12, 13, 27; 11, 12, 13, 27, 30; 11, 12, 13, 27, 31), and selective actuation of the at least six shift elements implementing different transmission ratios between the drive shaft (2) and the output shaft (3; 20);
the drive shaft (2) being continuously connected to the carrier of the second planetary gear set (5) and being connectable, via the third clutch (13), to the third shaft (14);
the third shaft (14) being continuously connected to the carrier of the first planetary set (4) and the third shaft (14) being connectable, via the first brake (8), to the housing (1) and the third shaft (14) being connectable, via the first clutch (11), to the fourth shaft (15; 23);
the fourth shaft (15; 23) being continuously connected to the ring gear of the third planetary gear set (6);
the fifth shaft (16) being continuously connected to the ring gear of the second planetary gear set (5) and the sun gear of the third planetary gear set (6) and the fifth shaft (16) being connectable, via the second clutch (12), to the output shaft (3; 20); and
the sixth shaft (17; 26) being continuously connected to the ring gear of the first planetary gear set (4).

18. The multi-stage transmission according to claim 17, wherein
the output shaft (3) is continuously connected to the carrier of the fourth planetary gear set (7);
the fourth shaft (15) is continuously connected to the sun gear of the fourth planetary gear set (7);
the sixth shaft (17) connects the sun gear of the second planetary gear set (5) to the carrier of the third planetary gear set (6);
the seventh shaft (18) is connected to the sun gear of the first planetary gear set (4) and the seventh shaft (18) is releasably connectable, via a second brake (9), to the housing (1); and
the eighth shaft (19) is connected to the ring gear of the fourth planetary gear set (7) and the eighth shaft (19) is connectable, via a third brake (10), to the housing (1).

* * * * *